Aug. 20, 1935.   J. M. YOUNG   2,012,213
CONTAINER
Filed Sept. 23, 1932
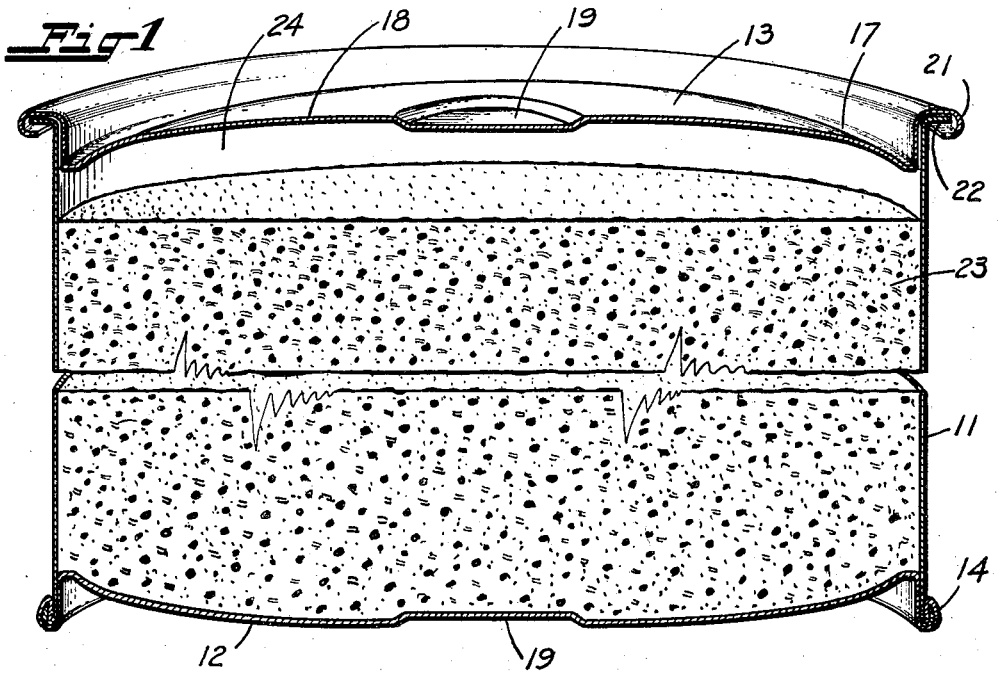
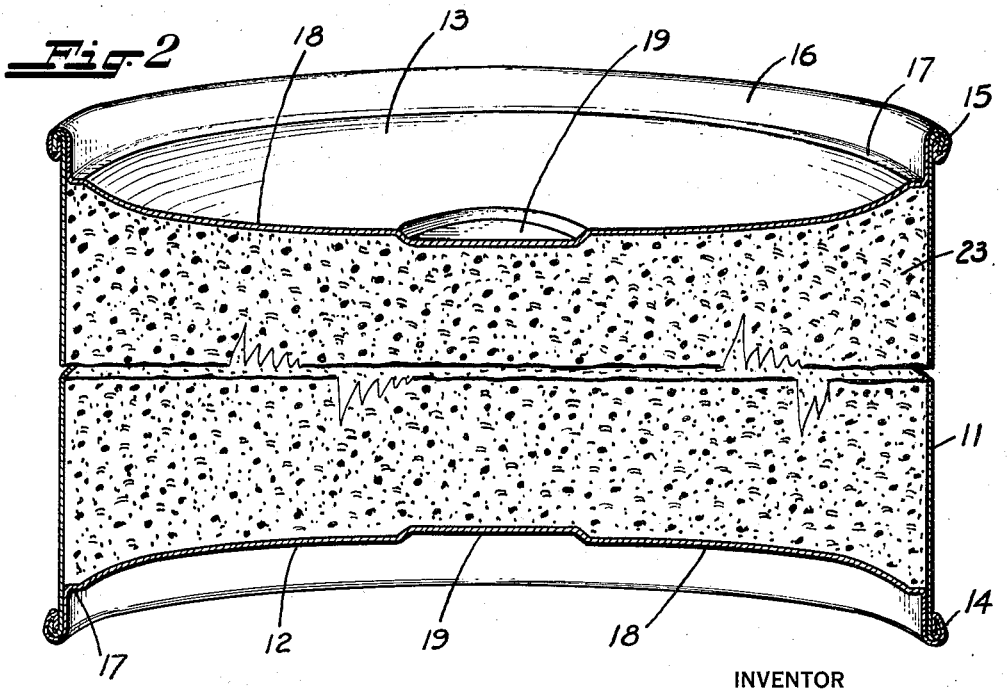
INVENTOR
John M. Young
BY
John C. Carpenter
ATTORNEY Patented Aug. 20, 1935

2,012,213

UNITED STATES PATENT OFFICE 2,012,213

CONTAINER

John M. Young, Brooklyn, N. Y., assignor to American Can Company, New York, N. Y., a corporation of New Jersey Application September 23, 1932, Serial No. 634,552

6 Claims. (Cl. 220—66)

This invention relates in general to containers adapted to be vacuumized and more particularly to a sheet metal container adapted for the packing of ground coffee or similar products under vacuum.

A principal object of the invention is the provision of a sheet metal container, for the packing of ground coffee or similar products under a high vacuum, having metal ends so shaped and proportioned that they will bear tightly upon and compress the contents, irrespective of small variations in volume of the contents, upon a vacuum being established within the container.

An important object of the invention is the provision of such metal ends in a container, which, while themselves collapsing inwardly a certain distance according to their elasticity and according to the volume of the product within the container, will at the same time prevent the collapse or inward bending of other container parts, because of the tendency of the ends to press the contents against all other parts of the container, thereby making the contents function as an inner support.

Numerous other objects and advantages of the invention will be apparent as it is better understood from the following description, which, taken in connection with the accompanying drawing, discloses a preferred embodiment thereof.

With reference to the drawing:

Figure 1 is a vertical sectional view of a container embodying the present invention, with parts broken away, and showing the ends bowed outwardly, as they are before the sealing and vacuumizing of the container is completed; and Fig. 2 is a view similar to Fig. 1, showing the ends flexed inwardly, as they are when the sealing and vacuumizing of the container is completed.

While the invention is applicable to the packing of a variety of other products, it was conceived primarily for the purpose of packing ground coffee in hermetically sealed sheet metal containers under a high vacuum.

Ground coffee is packed in hermetic containers under vacuum to prevent air from coming in contact with the oils of the coffee; in other words, to prevent oxidation of these oils, to thereby retain the aromatic flavors and to prevent a rancid taste of the coffee. The greater the vacuum within the container the less the chance of deterioration of these oils and flavors. It is customary to pack coffee in about 28 inches of vacuum.

Where such a high vacuum is drawn in containers made from standard tin plate, the walls of such containers will collapse, unless the containers be of small diameter and height, because of the difference in pressure on the inside and outside of the container.

Because of this danger of collapse it has been impractical, heretofore, to pack coffee on a commercial scale in large cans, under a high vacuum unless the cans were tightly filled with coffee. This is not commercially practical because cans are filled by weight and different blends and roasts of coffee have different volumes.

The preferred embodiment of the invention illustrated in the drawing comprises a cylindrical sheet metal container having a cylindrical body 11, a circular bottom end 12 and a circular top end 13. The two ends, made of resilient tin plate, are identical in shape and size and both are secured to the body 11 by interlocking the outer marginal flanges of the ends with the bottom and top flanges of the body to form bottom and top double seams 14 and 15. Both double seams may be lined with a gasket or sealing compound or otherwise rendered hermetic.

Each end, as fully applied to the body, comprises, inward of the double seam, a vertical wall part 16 which closely engages the inner wall of the body back of the double seam, then merges into a horizontal annular shoulder 17, which in turn merges into a curved panel 18, which has a central depression 19. The parts 16 to 19 form together what is commonly called the countersink, into which fits the seaming chuck during the double seaming operation. The depression 19 is provided to reinforce the end and to give it an attractive paneling effect.

Figure 1 shows the top end 13 loosely applied to the body 11, i. e. the outer marginal flange 21 of the end is crimped under the flange 22 of the body, to hold the end in place until the vacuumizing and double seaming operation begins and also to provide a passageway for the air to leave the container when a vacuum is drawn. At this time the end parts 18—19 are bulged or flexed outwardly. This is the normal shape of these parts when the ends are turned out by the forming dies.

The coffee packer is supplied by the can maker with bodies 11 having their bottom ends 12 already double seamed to them. The packer is also supplied separately with an equal number of flanged top ends 13. The packer then fills the container with a unit charge of freshly roasted and ground coffee 23, which is always of uniform weight, since coffee is sold by weight. The volume of the unit weight, however, varies with different roasts and different blends of coffee. It is to allow for such variations in volume and to provide for substantial compression or compacting of both minimum and maximum volumes of coffee contents by the two end members, when a high vacuum is drawn in the filled container, that the ends are provided with bowed or domed countersinks.

When a vacuum has been drawn in the filled container just prior and/or during the double seaming operation and the top end 13 is double seamed to the container body 11 by the packer and the hermetically sealed and vacuumized container is brought into the atmosphere, the domed or bulged bottom and top end parts 18—19, assume the position shown in Fig. 2, i. e. these parts are flexed or sprung inwardly past their center planes thereby compacting the coffee contents, forcing the contents against the cylindrical wall of the body 11 and preventing its collapse. The coffee contents are thus equally distributed between the two ends and the space 24 as shown in Fig. 1 is completely taken up by the coffee, which now acts as an internal support for the side walls. With the top and bottom ends thus arranged pressure is exerted axially of the can so that the mass of coffee is held against axial displacement and in position to resist radial strain.

While the parts 18—19 are capable of being flexed inwardly to the same extent as their original outward bulging, taking the horizontal annular shoulder 17 as a median line, the degree of their inward flexure is, of course, modified by the variation in coffee volume and also by the degree of vacuum drawn. It can be controlled, however, to always provide sufficient compacting pressure.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A hermetically sealed package containing a relatively dry product under vacuum, comprising a tubular can body having at least one concave flexible end closure seamed thereto, said product entirely filling said body and being of a mobile quality, said product being in such pressed or compacted condition by means of air pressure on said concave end closure as to react positively against the entire interior lateral wall surface of the container walls by virtue of direct forcible impingement of one dry particle against another, whereby to resist or counteract that exterior atmospheric pressure which arises by virtue of the fact that the interior of said package and the contained product are under vacuum.

2. A packed vacuumized container, comprising a container body, a relatively dry granular product under vacuum completely filling the container, a flexible imperforate dished in end hermetically sealed to said container body, the granular product being under pressure due to contact with the end and atmosphere pressing upon said end, the granular product thus supporting the entire lateral wall surface of the container body against collapse by virtue of direct forcible impingement of one dry granule against another throughout the contents of the container.

3. A hermetically sealed package containing a relatively dry product under vacuum, comprising a tubular container body having end closures seamed thereto, said product entirely filling said body and being of a mobile quality, a said end closure being flexed inwardly by exterior air pressure and pressing upon said product, said product transmitting the pressure exerted by said end closure to react positively against the interior lateral wall surface of the container body due to direct forcible impingement of one dry particle against another, whereby to resist that exterior atmospheric pressure which arises by virtue of the interior of said package and the contained product being under vacuum.

4. A hermetically sealed package containing a relatively dry product under vacuum, comprising in combination, a tubular container body, end closures seamed thereto, the product capable of being forced endwise and sidewise inside the container and filling said container, a said end closure being flexed inwardly under atmospheric pressure by reason of a vacuumized condition existing within said container, said inwardly flexed end bearing upon said product and pressing it against the entire interior surface of the container walls, due to direct forcible impingement of one dry particle against another, whereby to support the container body against collapse.

5. A hermetically sealed package containing a dry coffee product under vacuum, comprising in combination a tubular container body, flexible end closures seamed thereto, said coffee product filling said container, said end closures being flexed inwardly under external atmospheric pressure by reason of a vacuumized condition existing within said container, said inwardly flexed ends bearing upon said product and pressing it outwardly against the entire interior surface of the container walls due to direct forcible impingement of one dry particle against another, thus supporting the container body against collapse.

6. A hermetically sealed package containing a product under vacuum, comprising in combination: a tubular container body of such character as to require internal bracing against collapse due to atmospheric pressure, end closures seamed thereto, the product being mobile and capable of being forced endwise and sidewise inside the container and filling said container, one of said end closures being flexed inwardly under atmospheric pressure by reason of a vacuumized condition existing within said container, said inwardly flexed end bearing upon said product and pressing it against the entire interior surface of the container walls, thus supporting the container body against collapse.

JOHN M. YOUNG.